(12) United States Patent
Ott

(10) Patent No.: US 6,614,471 B1
(45) Date of Patent: Sep. 2, 2003

(54) LUMINANCE CORRECTION FOR COLOR SCANNING USING A MEASURED AND DERIVED LUMINANCE VALUE

(75) Inventor: Cynthia D. Ott, Oakland, CA (US)

(73) Assignee: BancTec, Inc., Irving, TX (US)

( * ) Notice: Subject to any disclaimer, the term of this patent is extended or adjusted under 35 U.S.C. 154(b) by 0 days.

(21) Appl. No.: 09/309,024

(22) Filed: May 10, 1999

(51) Int. Cl.[7] ............................. H04N 9/68; H04N 1/46
(52) U.S. Cl. ..................... 348/238; 348/234; 358/514
(58) Field of Search ............................ 348/234, 235, 348/236, 237, 238, 272, 273, 280, 281; 358/505, 513, 514, 518, 482, 483

(56) References Cited

U.S. PATENT DOCUMENTS

| | | |
|---|---|---|
| 4,205,337 A | 5/1980 | Millward |
| 4,310,847 A | 1/1982 | Frohbach et al. |
| 4,330,793 A | 5/1982 | Stemme et al. |
| 4,418,358 A | 11/1983 | Poetsch et al. |
| 4,630,120 A | 12/1986 | Childs |
| 4,672,424 A | 6/1987 | Lechner |
| 4,703,365 A | 10/1987 | Mumford |
| 4,709,144 A | 11/1987 | Vincent |
| 4,716,456 A | 12/1987 | Hosaka |
| 4,736,251 A | 4/1988 | Sasaoka |
| 4,745,466 A | 5/1988 | Yoshida et al. |
| 4,823,186 A * | 4/1989 | Muramatsu ............... 348/236 |
| 4,918,523 A | 4/1990 | Simon et al. |
| 4,969,204 A | 11/1990 | Melnychuck et al. |
| 4,982,270 A | 1/1991 | Tanaka et al. |
| 5,023,711 A | 6/1991 | Erhardt |
| 5,045,932 A | 9/1991 | Sharman et al. |
| 5,060,061 A | 10/1991 | Shishido et al. |
| 5,081,529 A | 1/1992 | Collette |
| 5,255,081 A | 10/1993 | Miyamoto et al. |
| 5,262,847 A | 11/1993 | Rodriguez et al. |
| 5,377,025 A | 12/1994 | Spaulding et al. |
| 5,543,940 A | 8/1996 | Sherman |
| 5,619,590 A * | 4/1997 | Moore, Jr. ............... 382/162 |
| 5,671,013 A * | 9/1997 | Nakao ...................... 348/234 |
| 5,677,528 A * | 10/1997 | Yamamoto et al. ...... 250/208.1 |
| 5,978,023 A * | 11/1999 | Glenn ...................... 348/234 |
| 6,356,379 B1 * | 3/2002 | Kreymerman ............ 359/305 |
| 6,429,953 B1 * | 8/2002 | Feng ........................ 358/520 |

FOREIGN PATENT DOCUMENTS

| | | |
|---|---|---|
| EP | 0 145 199 | 6/1985 |
| EP | 0 185 498 | 6/1986 |
| EP | 0 272 634 | 8/1988 |
| GB | 2 114 853 A | 8/1983 |
| GB | 2 191 061 A | 12/1987 |

* cited by examiner

*Primary Examiner*—Wendy R. Garber
*Assistant Examiner*—Justin Paul Misleh
(74) *Attorney, Agent, or Firm*—Locke Liddell & Sapp LLP

(57) ABSTRACT

A color scanning technique that maintains a high image quality while permitting improved scanning speed and improved perceived resolution. A color pixel array and a luminance pixel array are generated representative of a target object. The pixel arrays are related in that one or more luminance pixels of the luminance pixel array cover each pixel of the color pixel array. A luminance value is sensed for each luminance pixel, and three primary color values are sensed for each color pixel. A measured luminance value is then associated with each respective color pixel wherein the measured luminance value is a function of the sensed luminance values for the one or more luminance pixels covering the respective color pixel. A derived luminance value is also calculated for each respective color pixel wherein the derived luminance value is a function of the three sensed primary color values for the respective color pixel. A luminance correction factor is then determined for each respective color pixel as a function of the color pixel's derived and measured luminance values. The luminance correction factor for each respective color pixel is applied to the sensed primary color values of the color pixel, or to a linear combination thereof, to determine luminance-corrected color values. In this way the overall pixel luminance implied by the aggregate measured color values will show a consistency with the directly measured luminances. The luminance-corrected color values together with the measured luminance values may then be subjected to further appropriate transformation to determine color coordinates for each luminance pixel and/or for each color pixel, which may then be used in further processing. A logarithmic method is used for efficient computation of correction factors and luminance-corrected color values.

8 Claims, 3 Drawing Sheets

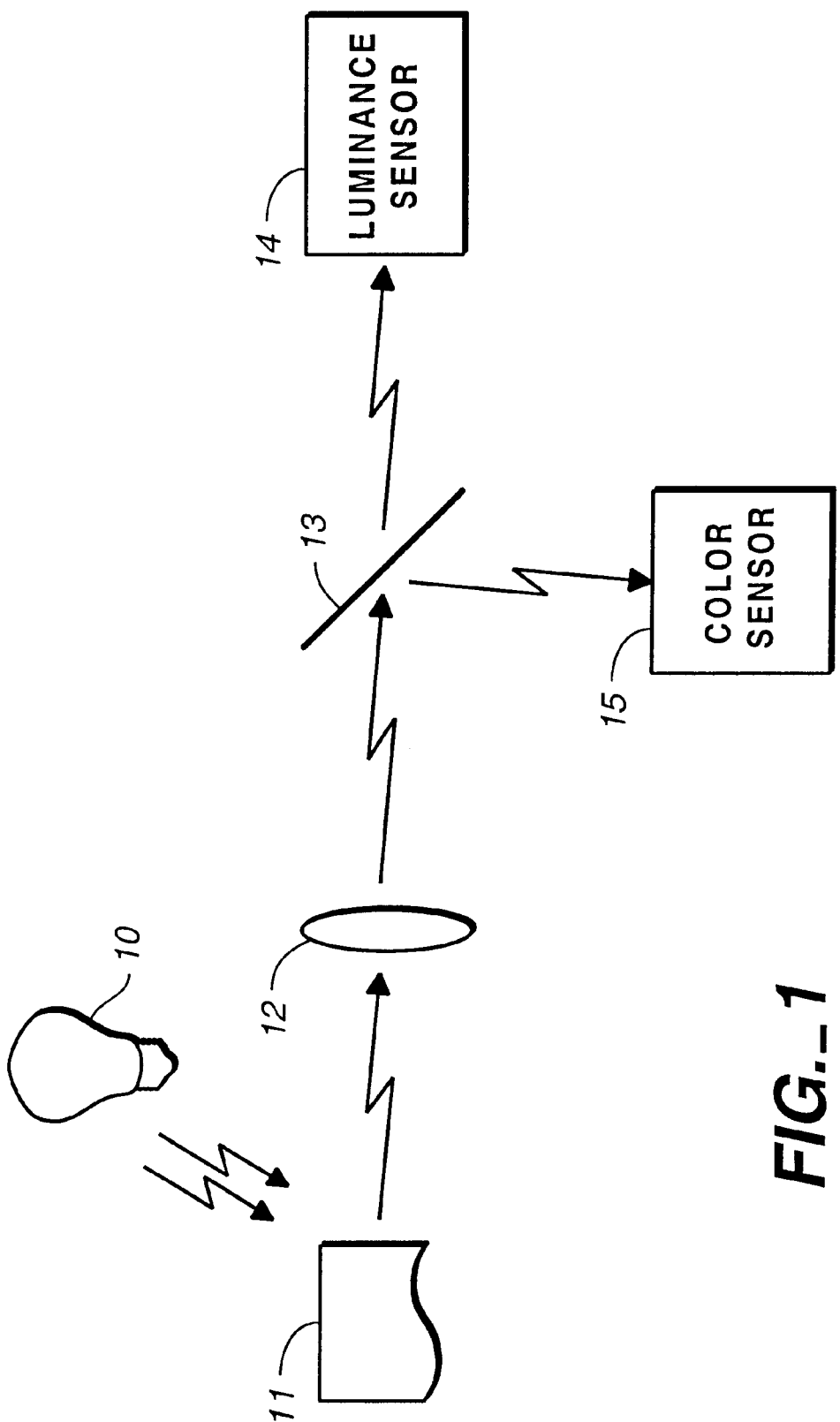
FIG._1

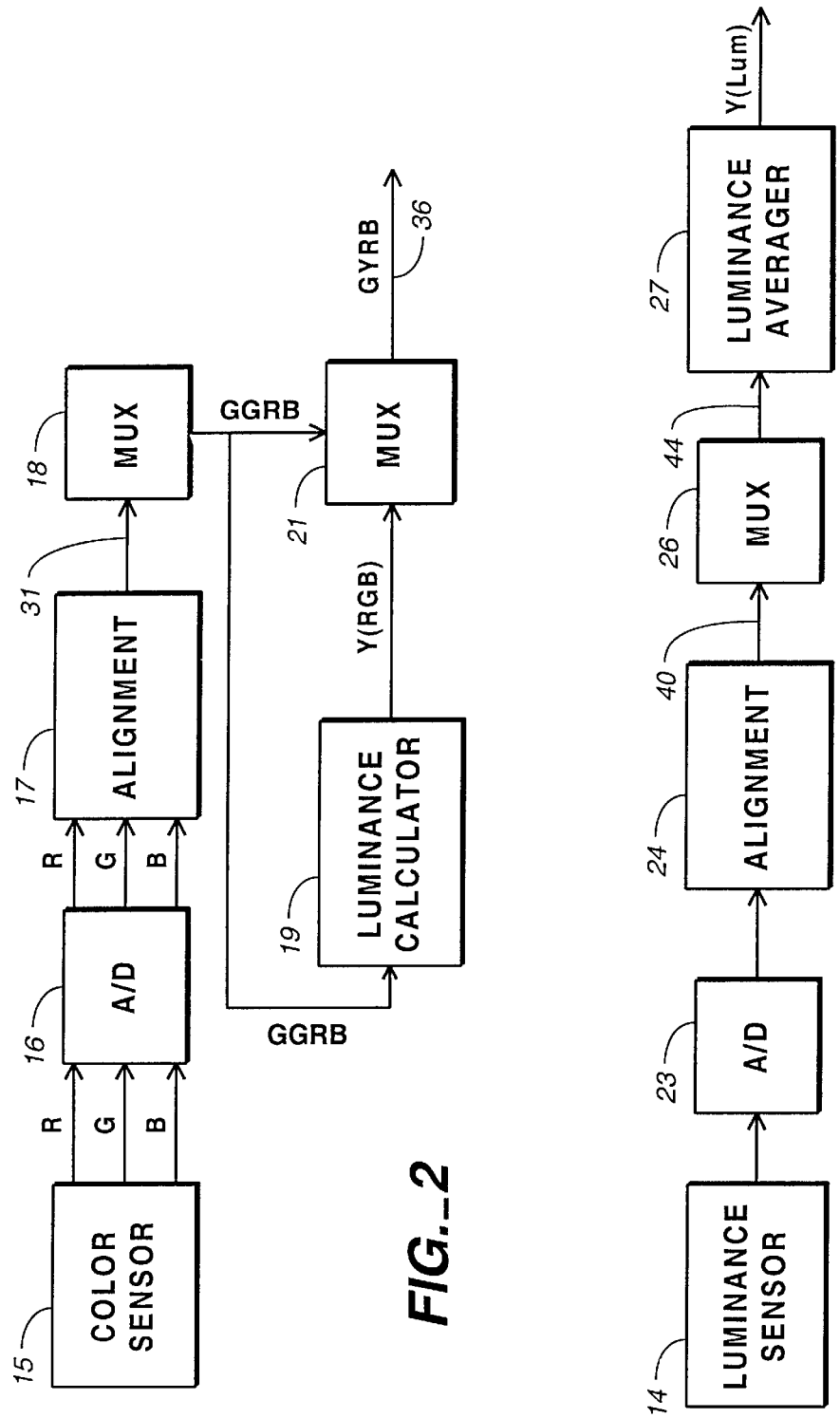

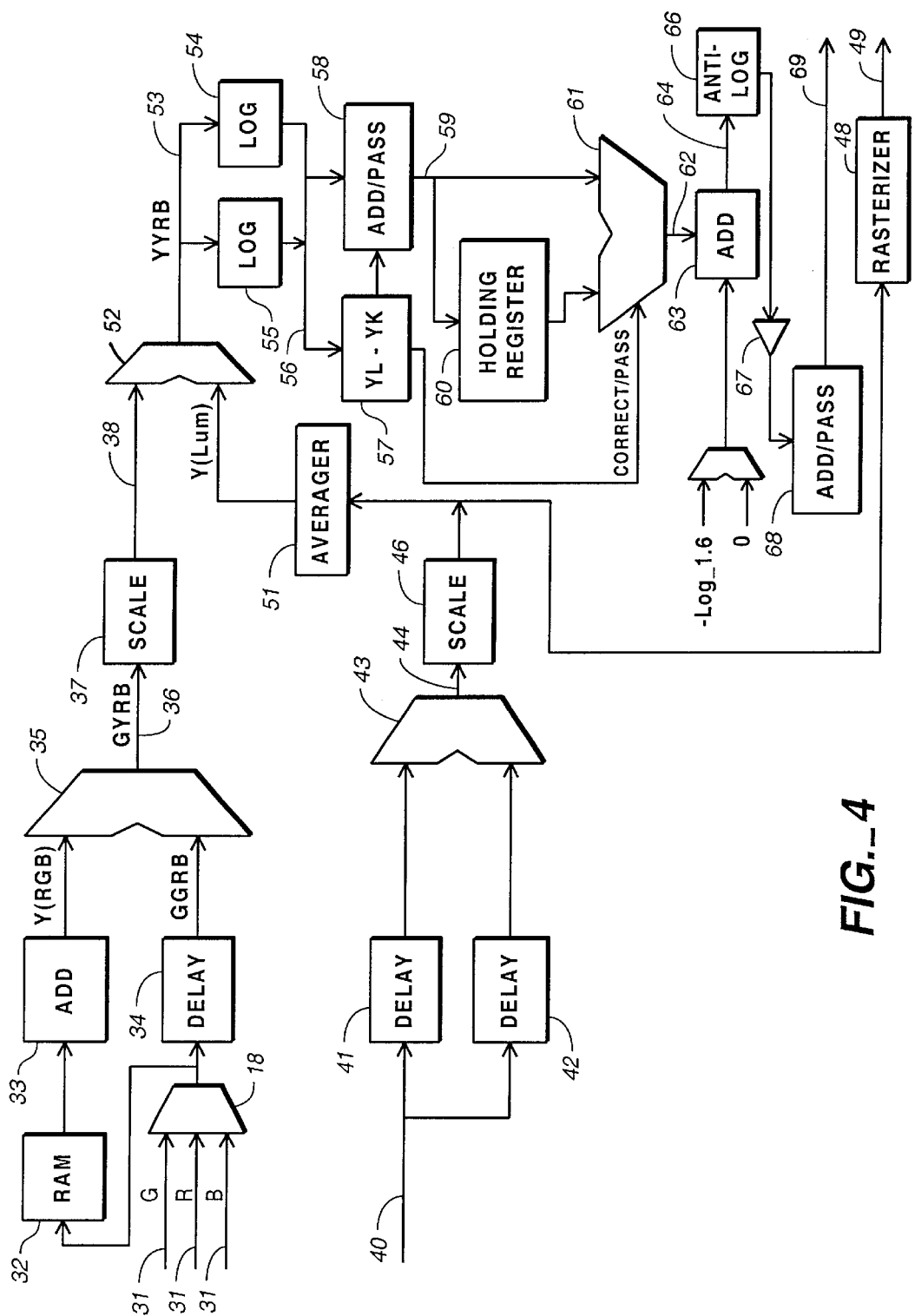
FIG._4

LUMINANCE CORRECTION FOR COLOR SCANNING USING A MEASURED AND DERIVED LUMINANCE VALUE

BACKGROUND OF THE INVENTION

The present invention relates to scanning of color images and is more particularly directed to techniques for maintaining image quality and especially for maintaining image quality while scanning at higher speeds.

Optical image scanners convert an object to be scanned such as a printed document, photograph, transparency or other image or scene into a digital electronic signal representative of the scanned object. The electronic signal may then be subjected to further processing and analysis and sent to an output device such as a printer or display monitor.

The image is typically captured by a sensor responsive to light from the target. For gray scale images (that is, so-called "black and white" images) a sensor is used that is responsive only to the luminance of the light from the scanned object and that does not distinguish colors. For color images a sensor is used that is separately responsive to the red, blue and green primary color components of the light from the target.

The sensors partition the image into arrays of pixels and associate a luminance value or red, blue and green values with each pixel. Commercially available gray scale sensors are generally capable of performing at higher speed and higher resolution than commercially available color sensors. Gray scan sensors typically operate in the range of 10 to 100 megapixels per second (MPix/s) while color sensors operate at 1 to 20 MPix/s. In comparing color and gray-scale rates, one color pixel is considered to have three color data channels associated with it for the three primary colors. Color scanners perform more slowly in part because of the increased amount of data they must scan and process.

In an attempt to improve the scanning speed of color images and improve image quality, some scanners include both luminance sensors and color sensors and scan the luminance data and the color data at two different resolutions. See for example U.S. Pat. Nos. 5,045,932 and 5,619,590. A high-resolution luminance sensor is used to capture the image detail, and a lower-resolution color sensor captures the color information. The data from the two sensors are then combined according to an appropriate scheme to provide an output signal. While such schemes generally show an improvement in scanning speed, and are sometimes able to maintain good image quality, they nevertheless represent a compromise in the quality of the original image.

SUMMARY OF THE INVENTION

The present invention provides a color scanning technique that maintains a high image quality while permitting improved scanning speed and improved perceived resolution. It is an object of the invention to achieve high-resolution color scans and particularly to improve upon the resolution that has generally been realized from commonly available color charge-coupled device (CCD) sensors. It is another object of the invention to achieve higher effective scanning speeds than has generally been realized with the commonly available color CCD sensors. It is yet another object of the invention to provide improved color coordinates, that is to say, values associated with each pixel, encoding the color information for each pixel. An important aspect of the invention is that the luminance data channel determines the overall luminance of the combined output signal, while the color data channels supply only the color information.

Briefly, a target object is scanned in accordance with the invention by generating a color pixel array representative of the target object, or at least of the portion of the object of interest, and also generating a luminance pixel array representative of the same portion. The color pixel array and luminance pixel array will generally be different, but they are related in that one or more luminance pixels of the luminance pixel array cover each pixel of the color pixel array. A luminance value is sensed for each luminance pixel, and three primary color values are sensed for each color pixel. A measured luminance value is then associated with each respective color pixel wherein the measured luminance value is a function of the sensed luminance values for the one or more luminance pixels covering the respective color pixel. In addition, a derived luminance value is also calculated for each respective color pixel wherein the derived luminance value is a function of the three sensed primary color values for the respective color pixel. A luminance correction factor is then determined for each respective color pixel as a function of the color pixel's derived and measured luminance values. The luminance correction factor for each respective color pixel is applied to the sensed primary color values of the color pixel, or to a linear combination thereof, to determine luminance-corrected color values. In this way the overall pixel luminance implied by the aggregate measured color values will show a consistency with the directly measured luminances that has not heretofore generally been realized or appreciated in the scanning field. The luminance-corrected color values together with the measured luminance values may then be subjected to further appropriate transformation, if desired, to determine color coordinates for each luminance pixel and/or for each color pixel. The color coordinates so determined provide an improved representation of the target object image exhibiting improved image quality, which may then be used to advantage in further customary image processing functions such as image compression, filtering and analysis, storage, transmission, printing or display.

In practice, determining and applying the luminance correction pixel by pixel can place a large computational burden on the system, which could appreciably slow down the processing. This comes about because the determination and application of the luminance correction factor will generally require pixel-by-pixel multiplication and division operations, which are demanding on system resources. The computational burden is greatly reduced, however, and the system processing rate is maintained, by converting the computationally laborious multiplication and division operations to much simpler addition and subtraction operations performed on the logarithms of the appropriate quantities.

The invention may advantageously be practiced with luminance and color sensors of high scanning rates so that the overall system will exhibit a high scanning rate. In so doing, the luminance correction of the present invention will provide a superior image quality to that achievable at the same scanning rate without the benefit of the invention. Moreover, a high-resolution image with improved image quality may be achieved with a high-resolution luminance sensor generally of higher resolution than the color sensor. Even with luminance and color sensors of same resolution, i.e., luminance pixels and color pixels of the same size, an improvement in image quality still results because the color values are corrected to be consistent with the true overall luminance value.

Other aspects, advantages, and novel features of the invention are described below or will be readily apparent to those skilled in the art from the following specifications and drawings of illustrative embodiments.

BRIEF DESCRIPTION OF THE DRAWINGS

FIG. 1 is a diagrammatic view of a scanning apparatus.

FIG. 2 is a block diagram showing the processing of the color data stream.

FIG. 3 is a block diagram showing the processing of the luminance data stream.

FIG. 4 is a block diagram of a particular embodiment of a color processing unit for practicing the invention.

DETAILED DESCRIPTION OF ILLUSTRATIVE EMBODIMENTS

FIG. 1 shows an idealized diagram of scanning apparatus for practicing the invention. The scanning apparatus includes a light source 10 for illuminating the object to be scanned, which is taken here to be a document 11 containing a color image. In a typical scanning apparatus, light source 10 generates a light beam that is directed to illuminate a horizontal strip across the document generally referred to as a scanline. The light beam reflecting off the document carries a color image of the scanline. An optical system represented diagrammatically by lens 12 focuses the reflected scanline beam and directs it to a beam splitter 13. One portion of the beam from the beam splitter is directed to a luminance sensor 14 and a second portion is directed to a color sensor 15. The structure and operation of such scanning apparatus is well known and is described herein only to the level of detail needed to describe the present invention.

For realistic image reproduction it is desirable that the response of luminance sensor 14 to the light reflected from the document correspond at least roughly to the response of a human observer to the document as illuminated by sunlight. To achieve this result, the signal from the luminance sensor should be properly color-balanced, for example, based on the NTSC standards. As is known in the art, this can be done with a judicious choice of phosphors in a fluorescent lamp or choice of filters in front of a variety of light sources having a variety of spectral characteristics such as fluorescent lamps characterized by spectral spikes and broad-spectrum incandescent and halogen lamps. Regardless of the shape of the spectrum from light source 10, however, the luminance sensor is better able to sense the luminance content of the target object than the color sensor, which includes necessarily imperfect bandpass filters for sensing color content. The invention takes advantage of this fact by correcting the color information for luminance content sensed by luminance sensor 14.

For the sake of illustration the luminance sensor may be provided by a 4096-element linear CCD array such as the P-series linear array available from Reticon. The color sensor may be provided by a 2048-element linear CCD array such as the model KLI-2113 array available from Kodak. Although the invention is illustrated here with linear arrays and single-line scans, it may also be implemented with area arrays, and those skilled in the art will be readily be able to adapt the method for use with area arrays given the explanations and examples provided below.

The luminance and color sensors generate independent pixel arrays representative of the target scanned object. For example, in the 4096-element Reticon array the pixels are arranged on 7-micron centers, and in the 2048-element Kodak array they are on 14-micron centers. Thus, for these sensors a color pixel is twice as wide and twice as tall as a luminance pixel. This means that two linescans with the luminance sensor correspond to one linescan with the color sensor and that each pixel from the color array covers the same area as, and, ideally at least, may be matched up with, a square composed of four luminance pixels (two adjacent pixels from each of two adjacent linescans). The correspondence of four luminance pixels to one color pixel is chosen for convenience of illustration and for ease of alignment in an actual embodiment. However, other numbers and geometrical relations of the two kinds of pixels may also be used.

In general, the luminance pixels are defined in a pattern covering the individual color pixels such that one or more luminance pixels forms a tiling of each color pixel. In the embodiment described here, four square luminance pixels cover one square color pixel. Other patterns may also be utilized. While improved resolution can be achieved if several luminance pixels correspond to one color pixel, some benefits of the invention will nevertheless be realized even if the luminance and color pixels are of the same size, that is, only one luminance pixel corresponds to each color pixel. Moreover, while the luminance and color pixels will preferably be aligned with one another, small discrepancies in the alignment may be tolerated. The important point is that the luminance of the luminance pixels covering a color pixel be determined substantially by the light coming from the area of the underlying color pixel. Thus, small misalignments of the color pixels and their corresponding luminance pixels can be tolerated to the extend that the contribution to the sensed luminance values from any misaligned portions is not significant.

The processing of the color data stream from color sensor 15 will now be described with reference to FIG. 2. Color sensor 15 provides a data stream composed of the three primary color values, taken here as red (R), green (G) and blue (B), associated with successive color pixels in successive linescans. The data streams from color sensor 15 are sent to three analog-to-digital (A/D) converters 16, which provide digital R, G and B data streams.

As is well known in the operation of color CCD sensors, many color sensors scan the individual pixels for their R, G and B values at different times. Processing block 17 applies appropriate delays so that all the color data from one pixel come out simultaneously. That is to say, this block aligns the R, G and B components of a pixel so that they lie on top of one another. Offset and gain correction are also performed at block 7. These operations are known in the art and need not be described in detail here. The output of block 17 is composed of three data streams of R, G and B data. In the current embodiment each R, G and B data stream operates at a 10MHz rate. Multiplexer 18 receives these data streams and provides a multiplexed data stream operating at four times the clock rate of block 17 (i.e., at 40-MHZ) and consisting of the components GGRB, where the second green (G) component is repeated in the data stream to serve as a placeholder for another value to be substituted later.

Block 19 receives the GGRB data stream from multiplexer 18 and calculates a luminance value for the individual pixels from their R, G and B values. The calculated luminance value is denoted Y(RGB). This is a luminance value that is derived entirely from the data sensed by color sensor 15 and does not derive from data sensed by luminance sensor 14. The specific calculation of the luminance value will be described in more detail below. The calculation is preferably based on a generally accepted luminance standard. For the specific embodiment described below the luminance is based on the MPEG definition, although other definitions could also be used consistent with the invention.

The value of Y(RGB) determined at block 19 is now substituted in place of the second G component in the GGRB data stream at multiplexer 21. The output of multiplexer 21 is then a multiplexed data stream with components GYRB for each pixel sensed by color sensor 15.

The processing of the data from luminance sensor 14 is shown in FIG. 3. The data stream or streams from luminance sensor 14 is digitized by A/D converter(s) 23. The digital data streams are sent to processing block 24 where various image processing steps may be performed. The data stream may be adjusted to compensate for gain and offsets. This serves to calibrate the data stream so that pure black will correspond to a luminance value of zero and full white to a value of unity. At this stage the luminance data stream is aligned so that each successive 2×2 block of luminance pixels sits on top of a corresponding color pixel. The data stream coming out of processing block 24 represents calibrated luminance pixels aligned on top of corresponding color pixels. Any other techniques may also be used for aligning a set of luminance pixels with the corresponding color pixel or pixels, and such techniques, while they may represent different tradeoffs in performance characteristics and ease of implementation, are considered equivalent for purposes of the present invention.

The data stream from processing block 24 comes out as a standard raster stream of pixels at 40 Mpix/s. This data stream is stored and used as the luminance component of the scanned image. The data stream is also rearranged at multiplexer 26 as two neighboring line scans simultaneously at 20 MPix/s. That is, a pair of linescans is presented simultaneously. The pair aligns with a single linescan from color sensor 15, which has pixels that are twice as tall as a linescan from luminance sensor 14. The 20-MHZ linescan pairs are multiplexed into a single video stream at 40 MHz for convenience in further processing. At this stage the data corresponding to a 2×2 block of luminance pixels in the luminance data stream from multiplexer 26 comes from the same place in the scanned document as the corresponding pixel in the color data stream from multiplexer 21. At block 27 the luminance values for the four luminance pixels aligned with a given color pixel are averaged to provide a single luminance value representative of the color pixel. This value is denoted Y(Lum) to indicate that it is a function of the four measured values stemming from the luminance sensor.

In the idealized situation the luminance value Y(Lum) of the spot on the document corresponding to any given color pixel as measured by luminance sensor 14 should agree with the luminance value Y(RGB) calculated from the R, G and B values measured by color sensor 15. In practice, however, these values do not always agree. A noticeable improvement in image quality has been realized in the present invention by adjusting color sensor measurements, and specifically by adjusting the R and B values, to match the higher-resolution measured luminance values while preserving the saturation and hue values measured by the color sensor. Moreover, this can be accomplished without any compromise in the processing speed.

For a greater understanding of the manner in which the luminance adjustment to the color pixels is made it is beneficial to discuss briefly the theory of color image processing. In image systems the primary colors R, G and B are defined on a relative scale from 0 to 1 chosen such that shades of gray are produced when R=G=B. White is given by R=G=B=1 and black by R=G=B32 0. The values of R, G and B all contribute to the perceived brightness, but must be weighted according to the relative sensitivity of the eye to each primary color.

The eye is most sensitive to green light, less sensitive to red light, and least sensitive to blue light, and the eye's ability to resolve spatial detail is best in the greens at the center of the visual spectrum and poorest in the blue. Color image compression schemes take advantage of this circumstance since there is no reason to accurately reproduce details that the eye cannot see. According to the MPEG standard the perceived luminance Y(RGB) as a function of the R, G and B values is taken as $Y(RGB)=0.299*R+0.587*G+0.114*B.$ The luminance Y(RGB) determined from the color channel at block 19 is calculated according to this equation.

It is noted that MPEG encoding is based on YUV encoding, where U approximately encodes the blue-yellow hue/saturation and V approximately encodes the red-green hue/saturation. The U and V values are defined as:

$U=B-Y(RGB)=0.886*B - (0,587*G+0.299*R),$ $V=R-Y(RGB)=0.701*R- (0,587*G+0.114*B).$

The parameters U and V can take on positive and negative values that can be inconvenient for processing. To eliminate negative values and give all three components roughly the same dynamic range, U and V are scaled and zero-shifted through a linear transformation to the color coordinates Cb and Cr, which are used in MPEG compression schemes:

$Cb=(U/2.0)+0.5=B/2.0-Y(RGB)/2.0+0.5,$ $Cr=(V/1.6)+0.5=R/1.6-Y(RGB)/1.6+0.5.$

The luminance Y is the same for the YUV and YCbCr color coordinate systems.

The use of the above equation for Y(RGB) in the present invention is convenient because it is consistent with the MPEG compression standard and is commonly used for JPEG compression. Other definitions of perceived luminance Y could also be used at block 19, however, consistent with other color coordinate or compression schemes.

The invention enforces a greater level of consistency in the processing of the color and luminance data. The higher-resolution luminance channel controls the luminance of the combined image data while the color channel controls the color. If no consistency between the channels were enforced, values of R, G and B significantly different from the original values, possibly even falling outside the permissible range could occasionally result if the inverse MPEG equations were applied to the data from the separate channels, leading to color shifts and excess or washed out color saturation.

The dominant factor in preserving image quality when forcing consistency between the luminance and the color channels is that the relative amplitudes of the red, green, and blue values for each color pixel be kept the same. If the three color values for a pixel are multiplied or divided by the same constant, only luminance of the pixel will be affected and the hue and saturation will remain unchanged. Consistency may therefore be enforced by applying an appropriate scaling factor, referred to as a luminance correction factor, to the color values from the color channel, which scaling factor may vary from color pixel to color pixel, so long as the same scaling factor is applied within a pixel.

Good results are achieved if the scaling factor for a color pixel is taken to be $$Y(Lum)/Y(RGB),$$

where Y(Lum) is the average of the luminance values from the four luminance pixels making up the color pixel:

$$Y(Lum)=\text{(sum of color pixel's four luminance channel values)}/4$$

That is to say, the color values of each color pixel are scaled to the pixel luminance from the luminance channel. In particular, $$R*Y/Y=R*Y(Lum)/Y(RGB),$$

$$B*Y/Y=B*Y(Lum)/Y(RGB).$$

This result is used if $$Y(Lum)/Y(RGB) < \text{ThresholdA},$$

and/or $$Y(RGB) > \text{ThresholdB},$$

where ThresholdA and ThresholdB are empirically selected parameters, which effectively determine whether there is enough light contrast to warrant using the color information. Color pixels falling below these thresholds do not have sufficient luminance content to warrant calculating a ratio. Otherwise, $$R*Y/Y=B*Y/Y=Y(Lum)$$

is used, which avoids color fringing.

If the YUV or equivalently YCbCr color coordinates are used, there is no need to adjust the G value, which does not appear in the calculation of these coordinates.

In terms of the adjusted R and B values the color coordinates Cb and Cr become $$Cb=(B*Y/Y)/2.0-Y(Lum)/2.0+0.5,$$

$$Cr=(R*Y/Y)/1.6-Y(Lum)/1.6+0.5.$$

While these color coordinates will achieve the advantage of improved image quality, they place a significant load on computational processing since multiply and divide operations must be performed with different multipliers and divisors for each color pixel.

The computational complexity may be reduced to a more manageable load with the aid of log and anti-log table lookups, which convert the multiplications and divisions to additions and subtractions. First the Y(Lum) data from the luminance data channel is multiplexed into the GYRB data stream in the color data channel, substituting Y(Lum) for G. The data stream now consists of Y(Lum), Y(RGB), R and B, referred to as the YYRB data stream. This is passed to a Log Table which returns the mantissa (the fractional portion of the log) and which in effect sets the logs of very small numbers to large numbers within a practical range, while the integer portion of the log is calculated separately. The luminance correction factor LCF is then calculated as $$\text{Log\_LCF}=\text{Log\_}Y(Lum) - \text{Log\_}Y(RGB).$$

and the following Log_YRB video stream is calculated and input to the anti-log lookup table, where Log_1.6 is a constant:

$$\text{Log\_}Y/1.6=\text{Log\_}Y(Lum)-\text{Log\_}2.6,$$

$$\text{Log\_}R*Y/Y/1.6=\text{Log\_}R+\text{Log\_}LCF-\text{Log\_}1.6,$$

$$\text{Log\_}Y=\text{Log\_}Y(Lum),$$

The 8-bit YRB video stream out of the anti-log table therefore holds the values $$Y/1.6=Y(Lum)/2.6,$$

$$R*Y/Y/1.6=R*Y(Lum)/Y(RGB)/1.6,$$

$$Y/1.0=Y(Lum), \text{ and}$$

$$B*Y/Y=B*Y(Lum)/Y(RGB).$$

These values may then be used in the equations for Cb and Cr, which now only require simple additions and subtractions.

Having described the theory of the invention, a description is now given of a particular embodiment for implementing the above calculations with reference to FIG. 4. Data lines 31 correspond to the line 31 from the alignment block 127 of FIG. 2. These data lines carry the aligned and otherwise pre-processed color values for one pixel. As described above, multiplexer 18 receives these data lines and provides a multiplexed data stream GGRB operating at four times the data rate of lines 31. Lookup Table 32 and adder 33 implement the luminance calculator shown in block 19. Together they implement the calculation $$Y(RGB)=(0.299*1024)*R+(0.587*1024)*G+(0.114*1024)*B.$$

The result is reintroduced into the multiplexed data stream with the aid of delay 34 and multiplexer 35 to provide multiplexed GYRB data stream 36.

The aligned and otherwise pre-processed raster luminance data line 40 is rearranged into 2×2 blocks or tiles using delays 41 and 42 and multiplexer 43 to provide tiled luminance data along line 44. At this point the color and luminance data along lines 36 and 44 may be subjected to linear image processing such as resolution scaling shown at blocks 37 and 46. The output of image processor/scaler 46 is re-rasterized at block 48 and provides a full-resolution luminance output on line 49. The output from image processor/scaler block 46 is also passed through 2×2 averager 51 and then to multiplexer 52, where it is multiplexed with the data on line 38 to provide the YYRB data stream on line 53. The 10-bit multiplexed YYRB data stream is passed to lookup table 54 and to mantissa calculator 55. The lookup table and mantissa calculator provide a 12-bit logarithm on line 56. At this stage a data stream is available on line 56 which is the log of the measured luminance value (Log_YL), followed by the log of the derived luminance value (Log_YK), followed by the log of the measured Red value (Log_R), followed by the log of the measured Blue value (Log_B). Log _YK is subtracted from Log_YL at subtracting accummulator 57 and the result is provided as an input to add/pass block 58. Block 57 also compares Log_YK and Log_YL−Log_YK with Log_ThresholdB and Log_ThresholdA, respectively, and supplies input correct/pass to multiplexer 61. Meanwhile, YL and YK are passed through block 58 to line 59. The output of block 57 is added is at block 58 to Log_R and Log_B and provided along line 59. Register 60 and multiplexer 61 rearrange the data to form a stream 62 in the format Log_YL, Log_R*Y/Y (or Log_YL if correct/pass==pass), Log_YL, Log_B*Y/Y(or Log_YL if correct/pass==pass). Data stream 62 is passed through adder 63, which adds a constant equal to zero or to −Log_1.6, Log_YL, Log_B*Y/Y. This 12-bit data stream is passed to anti-log table 66, the output of which is passed through multiplier 67, which applies a factor of −1, +1,−0.5,+0.5 to make a data stream of the form (−YL*256/1.6), (R*256/1.6), (−YL*256/2), B*256/2. Add/pass block 68 receives this data stream and produces outputs (−YL*256/1.6), CR=128+(R*256/1.6−YL*256/1.6), (−YL*256/2), CB=128+(B*256/2)−(YL*256/2). Line 69 then provides the desired chrominance output.

Although the invention is illustrated herein with reference to linear CCD sensors, the invention may be of benefit in any scanning apparatus subject to the same problems and tradeoffs as those using CCD sensors so that limitation to CCD-based scanning apparatus is not intended.

The above descriptions and drawings disclose illustrative embodiments of the invention. Given the benefit of this disclosure, those skilled in the art will appreciate that various modifications, alternate constructions, and equivalents may also be employed to achieve the advantages of the invention. Therefore, the invention is not to be limited to the above description and illustrations, but is defined by the appended claims.

What is claimed is:

1. A method of providing color values representative of a scanned target object, comprising the steps of:

generating a color pixel array representative of at least a portion of said scanned object;

generating a luminance pixel array representative of said portion of said scanned object, wherein at lease one luminance pixel of said luminance pixel array covers each color pixel of said color pixel array;

sensing a luminance value of each luminance pixel of said luminance pixel array;

providing a measured luminance value for each said color pixel as a function of the sensed luminance value of the at least one luminance pixel covering said color pixel;

sensing three primary color values for each said color pixel;

calculating a derived luminance value for each said color pixel as a function of the three sensed primary color values thereof;

determining a luminance correction factor for each said color pixel as a function of the derived luminance value thereof and the measured luminance value thereof; and applying said luminance correction factor to a desired linear combination of the sensed primary color values of each said color pixel to determine luminance corrected color values thereof.

2. The method of claim 1 wherein a plurality of luminance pixels of said luminance pixel array covers each color pixel of said color pixel array whereby said luminance pixel array provides a higher resolution than said color pixel array.

3. The method of claim 1 wherein said luminance pixel array is generated at a higher speed than said color pixel array.

4. The method of claim 1 wherein said luminance correction factor comprises the ratio of said derived luminance value to said measured luminance value at least for all color pixels with sufficient luminance content.

5. The method of claim 4 wherein the determination of said luminance correction factor includes the steps of:

determining a logarithm of said derived luminance value;

determining a logarithm of said measured luminance value; and subtracting said logarithm of said measured luminance value from said logarithm of said derived luminance value to determine a logarithm of said luminance correction factor.

6. The method of claim 5 the application of said luminance correction factor to the sensed primary color values includes the steps of:

determining a logarithm of a sensed primary color value; and adding said logarithm of said luminance correction factor to said logarithm of said sensed primary color value.

7. The method of claim 4 wherein said luminance correction factor is applied only to red and blue primary color values.

8. Apparatus for use in color scanning for correcting the luminance of a target object, comprising:

a color CCD sensor for generating a color pixel array representative of at least a portion of said scanned object and for sensing three primary color values for each color pixel comprising said portion;

a luminance CCD sensor for generating a luminance pixel array representative of said portion and for sensing a luminance value for each luminance pixel comprising said portion, wherein at least one luminance pixel of said luminance pixel array covers each color pixel of said color pixel array;

means for providing a measured luminance value for each said color pixel as a function of the sensed luminance value of the at least one luminance pixel covering said color pixel;

means for calculating a derived luminance value for each said color pixel as a function of the three sensed primary color values thereof;

means for determining a luminance correction factor for each said color pixel as a function of the derived luminance value thereof and the measured luminance value thereof; and means for applying said luminance correction factor to a desired linear combination of the sensed primary color values of each said color pixel to determine luminance corrected primary color values thereof.

* * * * *

UNITED STATES PATENT AND TRADEMARK OFFICE
CERTIFICATE OF CORRECTION

PATENT NO. : 6,614,471 B1
DATED : September 2, 2003
INVENTOR(S) : Cynthia D. Ott It is certified that error appears in the above-identified patent and that said Letters Patent is hereby corrected as shown below:

Column 6,
Line 1, replace "R=G=B32 0" with -- R=G=B=0 --.
Line 24, replace "U=B-Y(RGB)=0.886*B - (0,587*G+0.299*R),"
with -- U=B-Y(RGB)=0.886*B - (0.587*G+0.299*R), --
Line 26, replace "V=R-Y(RGB)=0.701*R - (0,587*G+0.114*B)."
with -- V=R-Y(RGB)0.701*R - (0.587*G+0.114*B). --

Column 8,
Line 8, insert the following which was omitted in its entirety:
-- Log_B*Y/Y = Log_B+Log_LCF --
Line 10, replace "Y/1.6=Y(Lum)/2.6," with -- Y/1.6=Y(Lum)/1.6, --
Line 23, replace "127" with -- 17 --.

Signed and Sealed this

Sixteenth Day of December, 2003

JAMES E. ROGAN
*Director of the United States Patent and Trademark Office*